United States Patent [19]

Flaschar et al.

[11] 4,057,216
[45] Nov. 8, 1977

[54] ELECTROMAGNETIC VALVE

[75] Inventors: Heinz Flaschar, Asperg; Heinz Gand, Stuttgart, both of Germany

[73] Assignee: Robert Bosch GmbH, Stuttgart, Germany

[21] Appl. No.: 651,470

[22] Filed: Jan. 22, 1976

[30] Foreign Application Priority Data

Feb. 4, 1975 Germany .................. 7503234[U]

[51] Int. Cl.$^2$ ............................................. F16K 31/06
[52] U.S. Cl. ............................. 251/129; 137/DIG. 2
[58] Field of Search ................. 251/129; 137/DIG. 2; 251/141, 30

[56] References Cited

U.S. PATENT DOCUMENTS

| | | | |
|---|---|---|---|
| 1,649,900 | 11/1927 | Holdsworth | 251/129 |
| 1,986,158 | 1/1935 | Payne et al. | 137/DIG. 2 |
| 3,100,103 | 8/1963 | Bullard | 251/141 R |
| 3,451,429 | 6/1969 | Vick | 251/129 X |
| 3,523,676 | 8/1970 | Barker | 251/141 |
| 3,934,815 | 1/1976 | Marsden | 251/129 |

FOREIGN PATENT DOCUMENTS

| | | | |
|---|---|---|---|
| 1,181,744 | 1/1959 | France | 251/129 |
| 1,525,934 | 4/1968 | France | 251/129 |
| 748,407 | 4/1933 | France | 251/30 |
| 1,324,011 | 7/1973 | United Kingdom | 251/129 |

Primary Examiner—Arnold Rosenthal
Attorney, Agent, or Firm—Michael J. Striker

[57] ABSTRACT

The valve housing of an electromagnetic valve has a bore formed with a valve seat and a pair of fluid ports which communicate with the bore at opposite sides of the valve seat. A valve member is movable in the bore between first and second positions in which the valve member respectively engages and is spaced from the valve seat. The electromagnetic valve also includes an electromagnet which has a portion engageable with the valve member and which is movable between one position and another position in which it respectively permits and prevents movement of the valve member between said first and second positions thereof.

12 Claims, 2 Drawing Figures

ELECTROMAGNETIC VALVE

BACKGROUND OF THE INVENTION:

The present invention is generally directed to an electromagnetic valve and, more particularly, to improvements in such valves.

It is generally known in the prior art to provide electromagnetic valves with a ball member which is adapted to be engaged with or spaced from a valve seat by the reciprocal action of an armature of an electromagnet. However, the known electromagnetic valves are possessed of several disadvantages which affect their proper operation. For example, it is known to directly place the ball member into a recess formed in the movable armature. This construction is disadvantageous because the play of the ball member in the recess of the armature, as well as the play of the armature as considered with respect to the bore in which the armature is conducted add up to an unacceptable value. Since the ball member is not properly centered, this causes improper seating of the ball member with its valve seat, thus disadvantageously influencing the operation of the valve, particularly in quick-switching applications.

Furthermore, the prior art requires special adaptation of the magnetic and valve parts. Thus, it is frequently impossible to use a specific valve part in a multiplicity of applications without incurring great expense.

SUMMARY OF THE INVENTION

Accordingly, it is a general object of the present invention to overcome the disadvantages of the prior art.

A further object of the present invention is to substantially eliminate unacceptable play in the operation of the valve.

Still another object of the present invention is to simplify the construction of electromagnetic valves.

An additional object of the present invention is to provide an electromagnetic valve which can be used in a multiplicity of applications without requiring special adaptation thereof.

In keeping with these objects and others which will become apparent hereinafter, one feature of the invention resides in an electromagnetic valve which comprises a valve housing having a bore formed with a valve seat. A fluid inlet port and a fluid outlet port are provided in the housing and communicate with the bore at opposite sides of the valve seat. A valve member is movable in the bore between first and second positions in which the valve member respectively engages and is spaced from the valve seat. In addition, the valve comprises electromagnetic means having a portion engageable with the valve member and which is movable between one position and another position in which it respectively permits and prevents movement of the valve member between the first and second positions thereof.

The feature of mounting the valve member in the bore rather than in a recess formed in an armature of the electromagnetic means substantially reduces the play build-up generally encountered in the prior-art constructions. Thus, the valve member will be precisely centered in position with respect to its valve seat. In addition, the feature of having the fluid inlet and outlet ports respectively communicate with the bore at opposite sides of the valve seat assures a relatively large fluid stream flow through the housing. The valve construction is comprised of a small number of parts, thus simplifying the assembly and making it inexpensive to manufacture. Finally, the valve housing can be used with various types of electromagnetic sub-assemblies, thereby making it possible to use the valve housing in a plurality of applications.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
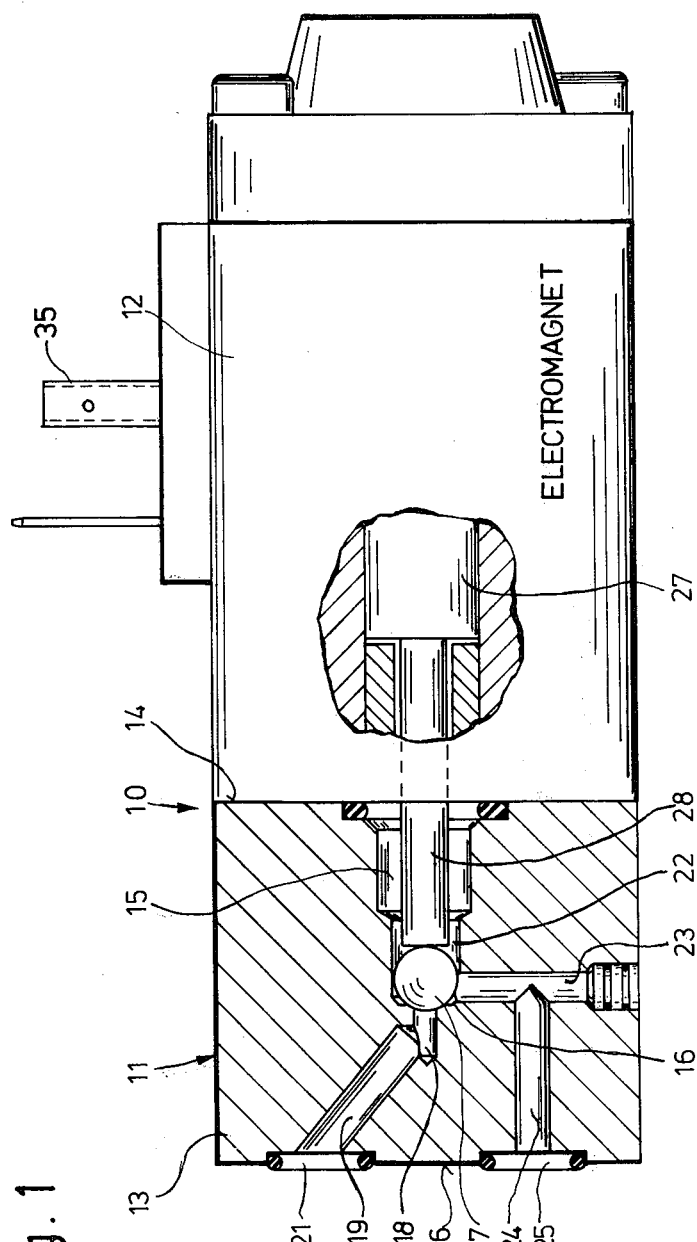
FIG. 1 is a side view in partial section of a normally-open electromagnetic valve in accordance with the present invention.

Referring firstly to FIG. 1 of the drawing, it will be seen that reference numeral 10 generally identifies an electromagnetic valve. The electromagnetic valve 10 is comprised of two parts, namely the valve housing part 11 and the magnet part 12. Parts 11 and 12 are connected to each other at the planar flange 14, preferably in pressure-tight sealing engagement as shown.

The valve housing 13 is formed with an elongated blind bore which extends from the flange 14 into the interior of the housing 13. The bore is comprised of a plurality of bore portions, each of which successively decrease in cross-section as viewed in direction from the flange into the interior of the housing 13. In FIG. 1, the largest bore portion, the smallest bore portion and a medium-sized bore portion are identified by reference numerals 15, 18 and 22, respectively.

At one end of medium-sized bore portion 22, a valve seat 16 is provided which cooperates with the spherically-configured valve member or ball 17. As will be described below, ball 17 is mounted in bore portion 22 for movement between first and second positions in which it respectively engages and is spaced from the seat 16 so as to prevent or permit the passage of fluid under pressure from the fluid inlet port 21 towards the fluid outlet port 25, or vice versa.

Fluid inlet and outlet ports 21, 25 communicate with opposite sides of the valve seat 16 as viewed with respect to fluid flow through the valve housing 13. At housing surface 26, which is preferably substantially parallel to the plane of the flange 14, ports 21 and 25 are formed with mouths positioned adjacent each other. Seals are provided in the mouths of ports 21 and 25 so as to facilitate a fluid-tight connection between an exterior source of pressurized fluid and the location where the fluid is to be conducted and the electromagnetic valve.

Fluid inlet port 21 is comprised of an inclined bore or passage 19 which extends from the mouth of port 21 to one side of the valve seat, and preferably to the smallest-sized bore portion 18, in an inclined direction relative to the direction of elongation of the bore. Of course, a pair of longitudinal and transverse passages could traverse this distance from the mouth of port 21 to the bore portion 18, thus replacing the inclined passage 19.

Fluid outlet port 25 is comprised of a longitudinally-extending bore or passage 24 which extends from the mouth of port 25 to the transverse bore or passage 23 which extends in direction transversely of the elongation of the bore until the transverse passage 23 communicates with the other side of the valve seat 16, that is until it reaches the bore portion 22. Transverse passage 23 is normally closed at its lower end.

The cross-section of bore portion 22 is chosen so that its diameter closely corresponds to the diameter of the ball 17. Thus, the ball 17 is properly moved therethrough with very slight play so that the ball 17 is always reliably centered with respect to the seat 16.

The cross-section of transverse passage 23 is chosen so that its diameter is slightly greater than the radius of the ball 17. Thus, when fluid entering from fluid port 21 reaches the side of the ball 17 adjacent the seat 16, the fluid will initially flow along the outer periphery of the ball 17 towards the transverse passage 23 and continue beyond the passage 23 to the opposite side of the ball 17 by means of the small gap which exists between the outer periphery of the ball 17 and the right side of the transverse passage 23. Consequently, a pressure balance or equilibrium is almost immediately obtained on opposite sides of the ball 17 without disturbing the position of the ball 17 in the bore portion 22.

Electromagnetic means is mounted to the valve housing 13 and is comprised of an electromagnetic 12 which is actuatable by electric current supplied by means of electrical plug 35 to move armature 27 and stem 28 which is fixedly connected to armature 27 to-and-fro in the bore. The length of stem 28 is chosen so that it projects into the interior of bore portions 15 and 22 until the left-most portion of the stem 28 is located adjacent the ball 17. The operation of the electromagnetic valve 10 is as follows:

When the electromagnetic means is not actuated, the movable stem 28 is freely movable. Thus, as fluid under pressure entering from inlet port 21 impinges against the ball 17, the ball 17 is forced towards the right side of FIG. 1 away from seat 16 into engagement with the stem 28, thereby pushing the latter back outwardly of the housing 13. Since the ball is now spaced from seat 16, a major portion of the entering fluid passes through the transverse bore 23 and out of the housing 13 through the longitudinally-extending bore 24. A small portion of the entering fluid flows past the ball 17 and into the bore portion 15. This operation of the normally-open valve 10 assures that the pressurized fluid will encounter only slight resistance in its passage through the housing, thus permitting a large flow stream and generally good operational characteristics. Fluid also flows into the pressure-tight electromagnet 12, whereby stem 28 and armature 27 is pressure balanced.

When the electromagnetic means is actuated, the stem 28 is moved towards the left side of FIG. 1 so that a portion of the stem 28 engages the ball 17 and pushes the same back into the valve seat 16. The force needed to be generated by the electromagnetic means need only overcome a force equal to the valve cross-section times the pressure. The working air gap in the electromagnet, which determines the stroke of the armature 27, is optimally selected so that only a minimum amount of electrical energy is necessary to move the stem 28. This movement, of course, interrupts the fluid flow, thus completing one switching cycle.

Figure 2:
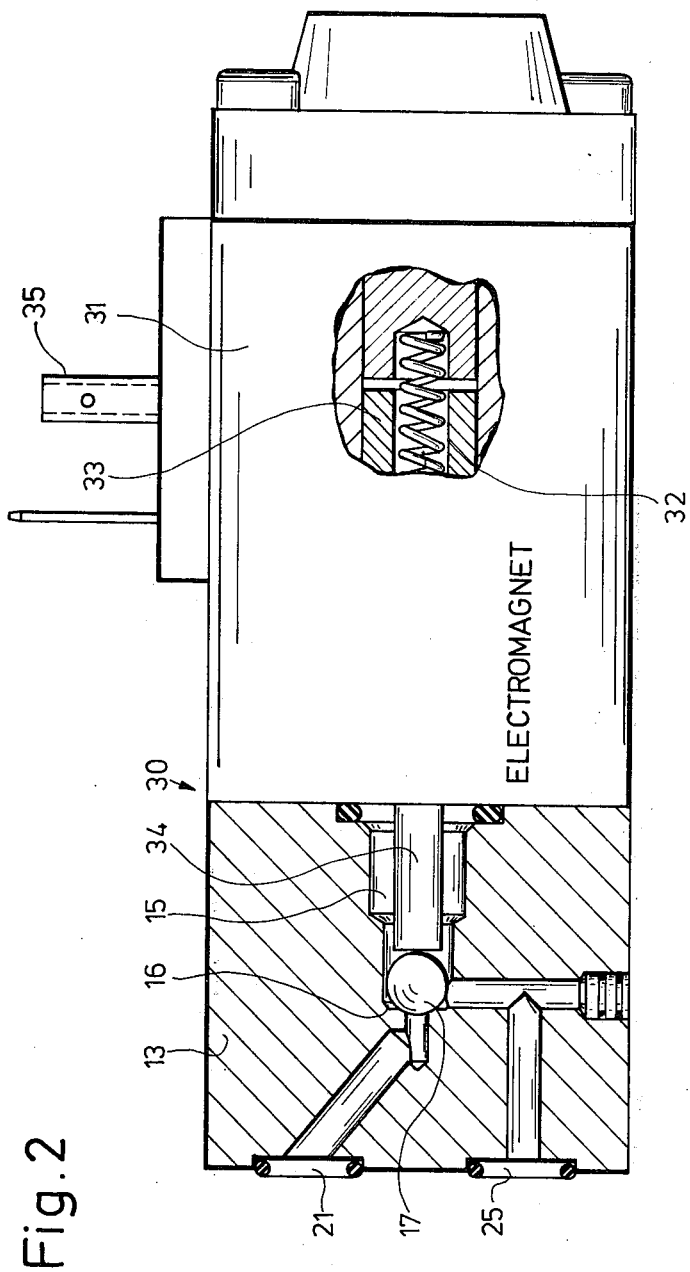
FIG. 2 is a side view in partial section of a normally-closed electromagnetic valve in accordance with the present invention.

Turning now more specifically to FIG. 2, a normally-closed electromagnetic valve 30 is illustrated. The valve 30 is comprised of a valve part and a magnet part. It will be appreciated that the valve part for valve 30 is identical with the valve part for valve 10 so that a discussion of the valve part for valve 30 will not be made for the sake of brevity.

As for the magnet part, the magnet 31 has an armature 33 to which a stem 34 is fixedly connected. The stem 34 is normally biased against the ball 17 by the biasing force provided by a spring 32 which normally urges the armature towards the left side of FIG. 2.

In the operation of the normally-closed electromagnetic valve 30, when the electromagnet is not actuated, the stem 34 is prebiased into engagement with the ball 17 so that the latter engages the seat 16 and prevents fluid entering from port 21 from flowing past the ball 17 towards the port 25. The biasing force of the spring 32 is preferably selected so that it corresponds to the highest pressure which is to be anticipated by the incoming pressurized fluid.

Subsequently, when the electromagnet is actuated, the stem 34 is moved towards the right of FIG. 1, thereby opposing the biasing force of the spring 32 and compressing the latter. Now, the force exerted by the entering fluid from port 21 will push the ball 17 off of the valve seat 16 since the ball 17 is now free to move inasmuch as it is no longer engaged by the stem 34. Fluid flow towards port 25 is now resumed.

From the description of the above-described embodiments, it will be understood that the valve parts can be used with a plurality of different types of electromagnet parts so as to easily convert a normally-open operated valve to a normally-closed operated valve, and vice versa. In accordance with the invention, the valve has been found to permit switching times of a few milliseconds and to be relatively unaffected by dirt and other contaminants.

The electromagnetic valve described herein can be used as a switching-type valve, particularly a quick-switching valve, wherein the electromagnet is either wholly energized or deenergized, or as a regulator valve in which the amount of electrical current is adjusted so as to move the armature through a proportional distance and thereby control the volumetric flow of the fluid stream.

It will be understood that each of the elements described above, or two or more together, may also find a useful application in other types of construction differing from the types described above.

While the invention has been illustrated and described as embodied in an electromagnetic valve, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An electromagnetic valve, comprising a valve housing having an elongated bore formed with a valve seat, said bore comprising a plurality of portions which successively decrease in cross-section in the direction of the elongation of said bore towards the interior of said valve housing so as to include a largest bore portion, a medium-sized bore portion and a smallest bore portion; a fluid inlet port and a fluid outlet port communicating with said bore at opposite sides of said valve seat, said fluid outlet port comprising a longitudinally-extending passage and a transverse passage communicating with said longitudinally-extending passage and extending in direction transversely of the elongation of said bore until said transverse passage reaches said medium-sized bore portion; a valve member movable in said bore between first and second positions in which it respectively engages and is spaced from said valve seat; and electromagnetic means having a portion engageable with said valve member and being movable between one position and another position in which it respectively permits and prevents movement of said valve member between said first and second positions thereof.

2. The electromagnetic valve of claim 1, wherein said valve member has a spherical configuration, and wherein said transverse passage has a circular cross-section whose diameter is slightly larger than the radius of said spherically-configurated valve member.

3. An electromagnetic valve, comprising a valve housing having an elongated bore formed with an open end and with a valve seat, said bore comprising a plurality of portions which successively decrease in cross-section in the direction of the elongation of said bore from said open end towards the interior of said valve housing; a fluid inlet port and a fluid outlet port communicating with said bore at opposite sides of said valve seat, said fluid outlet port comprising a longitudinally-extending passage and a transverse passage communicating with said longitudinally extending passage and extending in direction transversely of the elongation of said bore until said transverse passage reaches said bore intermediate said valve seat and said open end; a valve member movable in said bore between first and second positions in which it respectively engages and is spaced from said valve seat; and electromagnetic means having a portion engageable with said valve member and being movable between one position and another position in which it respectively permits and prevents movement of said valve member between said first and second positions.

4. An electromagnetic valve, comprising a one-piece valve housing having two opposite end faces, said housing having an elongated bore extending inwardly from one of said end faces and formed with a valve seat, said bore including a plurality of portions which successively decrease in cross-section in the direction of the elongation of said bore from said one end face towards the interior of said housing, said housing having a fluid inlet port and a fluid outlet port formed at the other end face of said housing and communicating with said bore at opposite sides of said valve seat, said bore and said inlet port and outlet port being formed in said one-piece housing; a valve member movable in said bore between first and second positions in which it respectively engages and is spaced from said valve seat; and electromagnetic means located in a casing having a mounting face in abutment with said one end face of said housing, said electromagnetic means having a portion engageable with said valve member and being movable between one position and another position in which it respectively permits and prevents movement of said valve member between said first and said second positions thereof.

5. The electromagnetic valve of claim 4, wherein said valve member has a spherical configuration.

6. The electromagnetic valve of claim 5, wherein said bore includes an elongated bore portion having a circular cross-section whose diameter corresponds to the diameter of said spherically-configurated valve member, said valve seat being formed at an end of said elongated bore portion.

7. The electromagnetic valve of claim 4, wherein said movable portion of said electromagnetic means includes an armature formed with an elongated stem which extends in direction from said electromagnetic means into said bore towards said valve member mounted therein.

8. The electromagnetic valve of claim 4, wherein said valve member is normally spaced from said valve seat in response to fluid under pressure entering from said inlet port and impinging against said valve member, and wherein said electromagnetic means is operative for urging said movable portion into engagement with said valve member so that the latter will move towards said first position thereof.

9. The electromagnetic valve of claim 4, wherein said electromagnetic means further comprises means for normally biasing said movable portion into engagement with said valve member so that the latter normally assumes said first position thereof, and wherein said electromagnetic means is operative for permitting said movable portion and said valve member to move respectively towards said one position and said second position in response to fluid under pressure entering from said inlet port and impinging against said valve member.

10. The electromagnetic valve of claim 4, wherein said fluid inlet port comprises a passage inclined relative to the direction of elongation of said bore and communicating with said smallest bore portion.

11. The electromagnetic valve of claim 4, wherein said casing of said electromagnetic means is mounted in pressure-tight engagement with said one end face of said housing.

12. The electromagnetic valve of claim 4, wherein said other end face of said valve housing is planar, and wherein said fluid inlet and outlet ports have mouths on said housing which lie adjacent each other and in a plane substantially parallel to the plane of said other end face.

* * * * *